(12) United States Patent
Zhu et al.

(10) Patent No.: US 11,641,046 B2
(45) Date of Patent: *May 2, 2023

(54) BATTERY MODULE

(71) Applicant: Contemporary Amperex Technology Co., Limited, Ningde (CN)

(72) Inventors: Xianchun Zhu, Ningde (CN); Hua Cao, Ningde (CN); Chong Wang, Ningde (CN); Mu Qian, Ningde (CN); Shixin Wu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 62 days.

This patent is subject to a terminal disclaimer.

(21) Appl. No.: 16/760,166

(22) PCT Filed: Nov. 26, 2019

(86) PCT No.: PCT/CN2019/120880
§ 371 (c)(1),
(2) Date: Apr. 29, 2020

(87) PCT Pub. No.: WO2020/134799
PCT Pub. Date: Jul. 2, 2020

(65) Prior Publication Data
US 2021/0218117 A1 Jul. 15, 2021

(30) Foreign Application Priority Data
Dec. 29, 2018 (CN) .......................... 201822267068.2

(51) Int. Cl.
*H01M 50/517* (2021.01)
*H01M 50/503* (2021.01)
(Continued)

(52) U.S. Cl.
CPC .......... *H01M 50/517* (2021.01); *H01M 6/50* (2013.01); *H01M 10/48* (2013.01);
(Continued)

(58) Field of Classification Search
CPC ............. H01M 50/503; H01M 50/502; H01M 50/569; H01M 50/517; H01M 50/50;
(Continued)

(56) References Cited

U.S. PATENT DOCUMENTS

2011/0045329 A1* 2/2011 Ikeda .................. H01M 10/482
429/91
2018/0358660 A1* 12/2018 Fan ...................... H01R 11/282

FOREIGN PATENT DOCUMENTS

| CN | 104685666 A | 6/2015 |
| CN | 105914506 A | 8/2016 |

(Continued)

OTHER PUBLICATIONS

PCT International Search Report for PCT/CN2019/120880, dated Mar. 4, 2020, 10 pages.

(Continued)

*Primary Examiner* — Niki Bakhtiari
*Assistant Examiner* — Grace Ann Kenlaw
(74) *Attorney, Agent, or Firm* — East IP P.C.

(57) ABSTRACT

The present disclosure relates to a battery module, including two or more battery cells, each including an electrode terminal; a connecting member, wherein the electrode terminals of adjacent battery cells are connected by the connecting member; and a clamping-sampling member, including a wire connection portion for fixing a wire harness and a clamping portion, wherein one end of the clamping portion is connected with the wire connection portion and the other end of the clamping portion clamps the connecting member.

10 Claims, 5 Drawing Sheets

(51) Int. Cl.
  *H01R 4/18* (2006.01)
  *H01R 4/48* (2006.01)
  *H01M 50/569* (2021.01)
  *H01M 10/48* (2006.01)
  *H01M 50/50* (2021.01)
  *H01M 6/50* (2006.01)

(52) U.S. Cl.
  CPC ......... *H01M 10/482* (2013.01); *H01M 50/50* (2021.01); *H01M 50/503* (2021.01); *H01M 50/569* (2021.01); *H01R 4/184* (2013.01); *H01R 4/48* (2013.01)

(58) Field of Classification Search
  CPC .... H01M 4/184; H01M 10/48; H01M 10/482; H01R 4/48
  See application file for complete search history.

(56) References Cited

FOREIGN PATENT DOCUMENTS

| | | |
|---|---|---|
| CN | 206098597 U | 4/2017 |
| CN | 206684255 U | 11/2017 |
| CN | 207818732 U | 9/2018 |
| CN | 209447908 U | 9/2019 |
| DE | 102009033044 A1 | 3/2010 |
| WO | 2011155369 A1 | 12/2011 |

OTHER PUBLICATIONS

The extended European search report for EP Application 19870046.0 , dated Nov. 16, 2020, 7 pages.

\* cited by examiner

BATTERY MODULE

CROSS REFERENCE TO RELATED APPLICATION

This application is the National stage of International Application No. PCT/CN2019/120880 filed on Nov. 26, 2019, which claims priority to Chinese Patent Application No. 201822267068.2, tilted "BATTERY MODULE" and filed on Dec. 29, 2018, which is hereby incorporated by reference in its entirety.

TECHNICAL FIELD

The present application relates to a production filed of energy storage device, and particularly relates to a battery module.

BACKGROUND

Currently, voltage is sampled by directly fixing a wire harness for collecting information on a connecting member by ultrasonic welding, aluminum wire bonding welding or laser welding. In the case of the ultrasonic welding and aluminum wire bonding welding, a strength is relatively low, and after the welding, the wire harness may easily break and thus fail when the battery module is subjected to vibration impacts, resulting in a low safety and reliability. The laser welding requires a relatively high flatness for the connecting member, resulting in a low peel strength after welding. Therefore, the connection also may fail easily under long-term cycle use of the battery and vibration impacts.

SUMMARY

Therefore, it needs a battery module to solve the technical problem that it is difficult to fix the wire harness for information collection with the connecting member.

For the above purpose, the present application provides a battery module, including:
  two or more battery cells, each including an electrode terminal;
  a connecting member, wherein the electrode terminals of adjacent battery cells are connected by the connecting member; and
  a clamping-sampling member, including a wire connection portion for fixing a wire harness and a clamping portion, wherein one end of the clamping portion is connected with the wire connection portion and the other end of the clamping portion clamps the connecting member.

According to the embodiments on one aspect of the present application, the clamping portion includes a first clamping part and a second clamping part, one end of the first clamping part is fixedly connected with one end of the second clamping part, while the other end of the first clamping part and the other end of the second clamping part form an opening of the clamping portion, and the one ends of the first clamping part and the second clamping part fixedly connected to each other are connected with the wire connection portion.

According to any of the above embodiments on one aspect of the present application, the first clamping part and the second clamping part are integrally formed.

According to any of the above embodiments on one aspect of the present application, the connecting member is provided with a sampling installation portion, and the clamping portion clamps the sampling installation portion.

According to any of the above embodiments on one aspect of the present application, the sampling installation portion is provided on a side of the connecting member facing the wire harness.

According to any of the above embodiments on one aspect of the present application, the sampling installation portion is formed by an indentation of the connecting member towards a battery top cover, so that the clamping-sampling member is attached to the battery top cover when clamping the sampling installation portion.

According to any of the above embodiments on one aspect of the present application, the first clamping part and the second clamping part are independently formed; the first clamping part is provided with a holding part for holding the second clamping part, or the second clamping part is provided with a holding part for holding the first clamping part, wherein the holding part is located at the one ends of the first clamping part and the second clamping part fixedly connected to each other.

According to any of the above embodiments on one aspect of the present application, the holding part includes two side wings respectively connected to two sides of the first clamping part or the second clamping part, each side wing is formed in a shape of "L" and includes a first arm and a second arm, the second arm is connected to the first clamping part or the second clamping part via the first arm, and the second arms of the two side wings are formed to extend towards each other.

According to any of the above embodiments on one aspect of the present application, the first clamping part and the second clamping part form a guide opening which flares outwards at an end of the opening.

According to any of the above embodiments on one aspect of the present application, the first clamping part is provided with a protrusion on a side surface of the opening facing the second clamping part, or the second clamping part is provided with a protrusion on a side surface of the opening facing the first clamping part; and the sampling installation portion is provided with a connection hole, and the protrusion is matched with the connection hole.

According to any of the above embodiments on one aspect of the present application, there are two or more connection holes.

According to any of the above embodiments on one aspect of the present application, the sampling installation portion is further provided with a guide slot extending from an end of the sampling installation portion towards an inside of the connecting member, so that the protrusion on the first clamping part or the second clamping part can slide along the guide slot.

According to any of the above embodiments on one aspect of the present application, the wire connection portion has a U-shaped cross section, so that the wire harness is installed within the wire connection portion.

In the embodiments of the present application, the wire harness for information collection in the battery module is connected to the connecting member by clamping the connecting member to the clamping-sampling member, instead of directly welding the wire harness with the connecting member. The information collection is achieved by directly fixing the wire harness on the wire connection portion and then clamping the connecting member to the clamping portion, which can effectively improve connection strength between the wire harness for information collection and the connecting member.

BRIEF DESCRIPTION OF THE DRAWINGS

Features, advantages, and technical effects of exemplary embodiments of the present disclosure will be described below with reference to the accompanying drawings, wherein the drawings are not drawn to actual scale.

Figure 1:
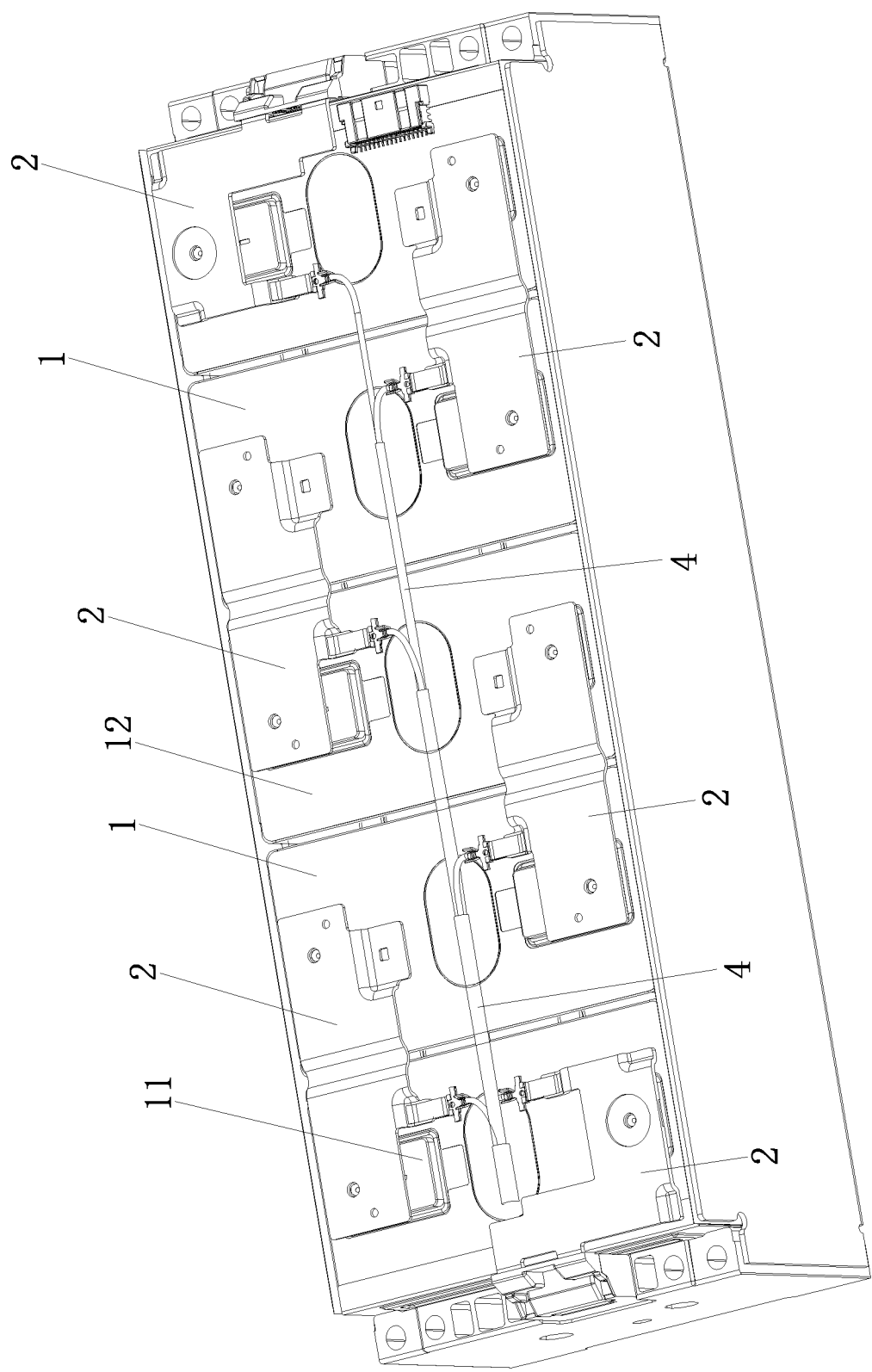
FIG. 1 is a schematic diagram showing a configuration of a battery module as a whole according to an embodiment of the present disclosure.

REFERENCE NUMERALS 1. battery cell;
11. electrode terminal;
12. battery top cover;
2. connecting member;
21. sampling installation portion;
22. guide slot;
23. connection hole;
3. clamping-sampling member;
31. first clamping part;
32. second clamping part;
33. opening;
34. holding part;
35. guide opening;
36. protrusion;
37. wire connection portion;
4. wire harness.

DETAILED DESCRIPTION

In order to illustrate in detail the technical contents, structural features, realized objects and effects of the technical solution, the following detailed description will be given in combination with the specific embodiments and the accompanying drawings.

In the description of the present application, unless otherwise specified and limited, the terms "first", "second" are only used for purpose of description, and cannot be understood as indicating or implying relative importance; unless otherwise specified and stated, the terms "install", "connect", or the like shall be understood broadly, and may be, for example, a fixed connection, a disassemble connection, an integral connection, or an electrical connection, and may be a direct connection or an indirect connection via an intermediate medium. The specific meaning of the above terms in the present disclosure can be understood by the person skilled in the art according to actual circumstance.

In the description of the present disclosure, it shall be understood that, positional terms, such as "upper", "lower", "left" and "right" are intended to make description in reference to angle of view as shown in the accompanying drawings, while not to limit the embodiments of the present disclosure. Further, in the context, it shall be further understood that, when it mentions that one component is connected to "a top" or "a bottom" of another component, it not only means that the component is directly connected to "the top" or "the bottom" of another component, but also means that the component is indirectly connected to "the top" or "the bottom" of another component via an intermediate component.

Figure 2:
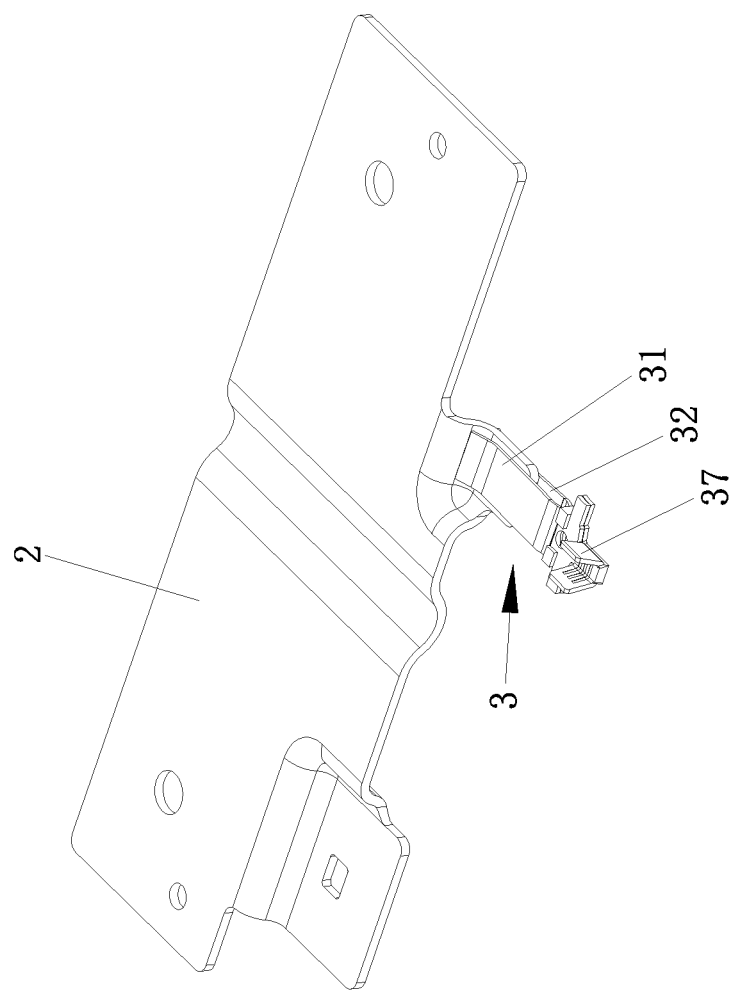
FIG. 2 is a state diagram showing a clamping-sampling member of a battery module clamping a connecting member according to an embodiment of the present disclosure.

Refer to FIG. 1 and FIG. 2, the present application provides a battery module, which includes: two or more battery cells 1, connecting members 2 and clamping-sampling members 3, wherein the battery cells 1 are disposed in an arrangement, that is, two or more battery cells 1 are arranged side by side. Each battery cell 1 is provided with an electrode terminal 11, and the electrode terminals 11 of adjacent battery cells 1 are connected by the connecting member 2; the clamping-sampling member 3 includes a wire connection portion 37 for fixing a wire harness 4 and a clamping portion, wherein one end of the clamping portion is connected with the wire connection portion 37, and the other end of the clamping portion clamps the connecting member 2. The wire connection portion 37 is used to fix the wire harness 4 for information collection, and the clamping portion is used for clamping of the clamping-sampling member 3 on the connecting member 2. The clamping portion and the wire connection portion 37 are both conductors for information collection. The information collection wire harness 4 obtains voltage information on the connecting member 2 via the wire connection portion 37 and the clamping portion, so as to obtain the voltage situation among the battery cells 1 in the battery module.

Figure 5:
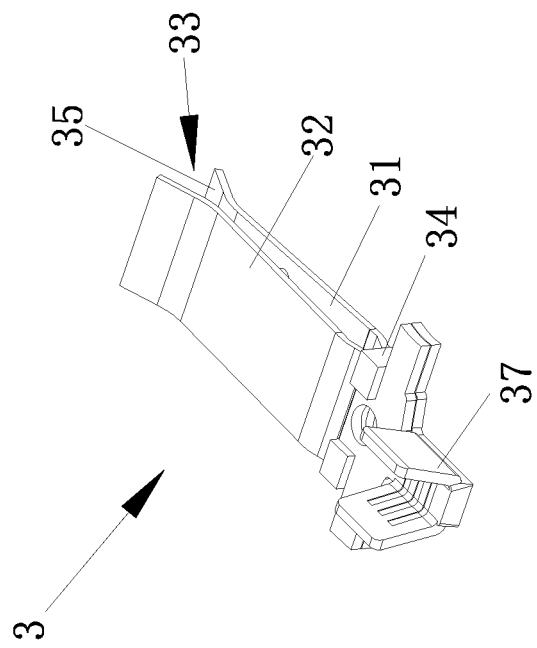
FIG. 5 is a perspective view showing a configuration of a clamping-sampling member of a battery module according to an embodiment of the present disclosure.
Figure 6:
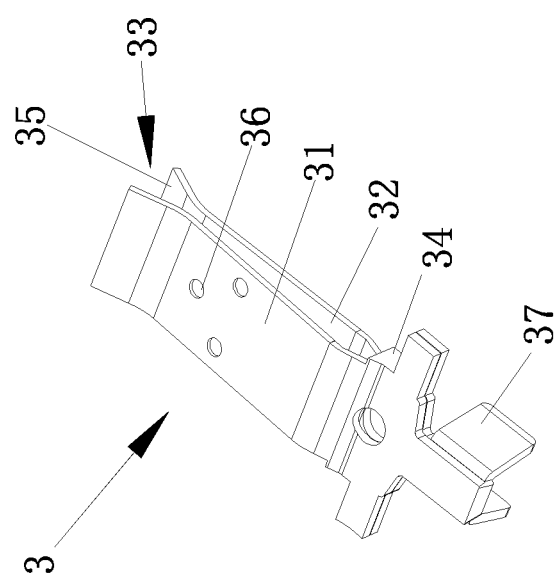
FIG. 6 is a perspective view showing a configuration of a clamping-sampling member of a battery module according to an embodiment of the present disclosure.
Figure 7:
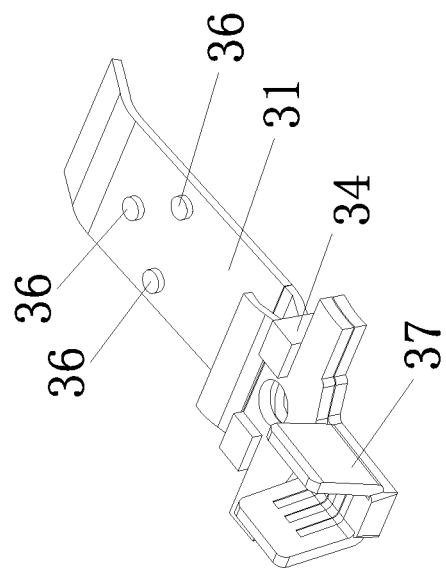
FIG. 7 is a schematic diagram showing a configuration of a clamping-sampling member of a battery module provided with a protrusion according to an embodiment of the present disclosure.

As shown in FIG. 5 to FIG. 7, in some preferred embodiments, the clamping portion includes a first clamping part 31 and a second clamping part 32 located on two sides of the clamping portion. That is, the clamping portion includes the first clamping part 31 and the second clamping part 32. One end of the first clamping part 31 is fixedly connected with one end of the second clamping part 32, while the other end of the first clamping part 31 and the other end of the second clamping part 32 form an opening 33 of the clamping portion, and the one ends of the first clamping part 31 and the second clamping part 32 fixedly connected to each other are connected with the wire connection portion 37.

In these embodiments, the first clamping part 31 and the second clamping part 32 are each formed in a sheet-like shape and have the same size. The other end of the first clamping part 31 extends in a same direction as the other end of the second clamping part 32, and the opening 33 formed by the first clamping part 31 and the second clamping part 32 is used to fix the clamping portion on the connecting member 2.

The opening 33 formed between the first clamping part 31 and the second clamping part 32 may be closed when not in use, that is, at least part of the first clamping part 31 and at least part of the second clamping part 32 are attached to each other when the opening is not in use; or, the opening 33 formed between the first clamping part 31 and the second clamping part 32 has a smallest gap value less than a thickness value of the connecting member 2, that is, the smallest distance between the first clamping part 31 and the second clamping part 32 is smaller than or equal to the thickness value of the connecting member 2. When using the clamping portion, an operator separates the first clamping portion 31 and the second clamping portion 32 so as to open the opening 33 and clamp the connecting member 2 to the clamping portion. Since the opening 33 formed between the first clamping part 31 and the second clamping part 32 is in a closed state or has a smallest gap value smaller than the thickness value of the connecting member 2, when clamping the connecting member 2 to the clamping portion, the clamping portion can be fixed with the connecting member 2.

In some preferred embodiments, the first clamping part 31 and the second clamping part 32 are integrally formed. An integral member of the first clamping part 31 and the second clamping part 32 are bent in a middle portion to form a first clamping part 31 and a second clamping part 32 opposite to each other, that is, the first clamping part 31 and the second clamping part 32 that are integrally formed are connected to each other via a bending part. The bending part is provided with a wire connection portion 37 for connecting with the information collection wire harness 4. After bending, the first clamping part 31 and the second clamping part 32 opposite to each other form an opening 33 of the clamping portion. That is, the first clamping part 31 and the second clamping part 32 connected by the bending part form the opening 33 of the clamping portion. The first clamping part 31 and the second clamping part 32 are made of ductile materials to ensure an elasticity of the opening 33 of the clamping portion.

Figure 3:
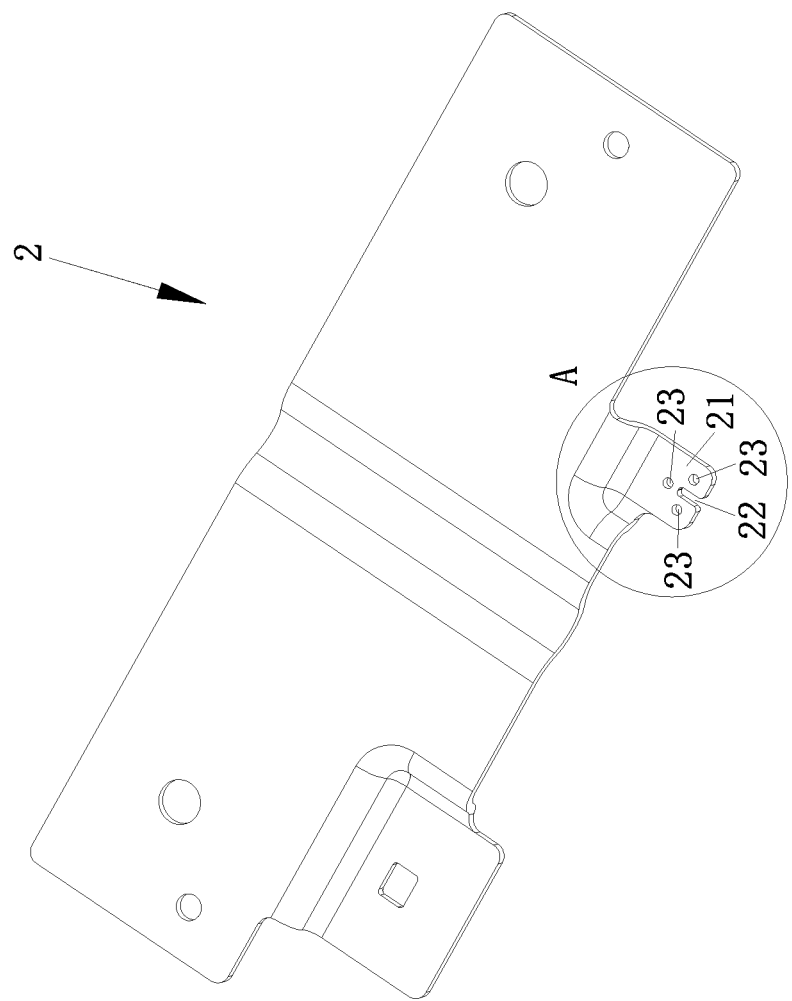
FIG. 3 is a schematic diagram showing a configuration of a connecting member of a battery module according to an embodiment of the present disclosure.
Figure 4:
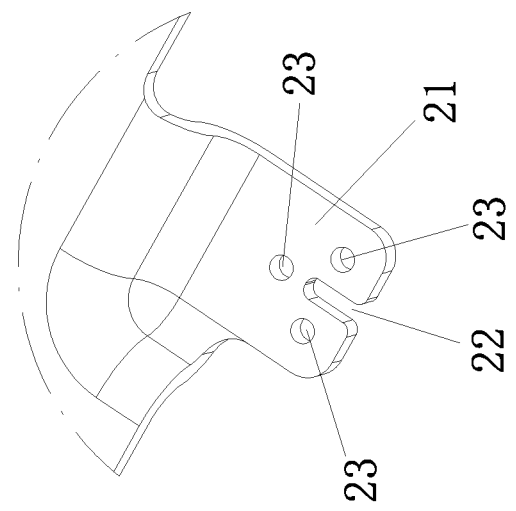
FIG. 4 is an enlarged view of the portion A in FIG. 3.

As shown in FIG. 3 and FIG. 4, in some preferred embodiments, the connecting member 2 is provided with a sampling installation portion 21, and the clamping portion clamps the sampling installation portion 21. In order to facilitate the installation of the clamping-sampling member 3 on the connecting member 2, the sampling installation portion 21 is arranged at a side position of the connecting member 2. That is, the sampling installation portion 21 is provided on a side of the connecting member 2 facing the wire harness 4. The sampling installation portion 21 provided on the connecting member 2, which is formed in a sheet-like shape, is an area recessed towards a battery top cover 12. That is, the sampling installation portion 21 is formed by an indentation of the connecting member 2 towards the battery top cover 12. After the clamping-sampling member 3 clamps the sampling installation portion 21 of the connecting member 2, the clamping-sampling member 3 is attached on a top of the battery top cover 12, and the wire harness 4 fixed on the wire connection portion 37 of the clamping-sampling member 3 may also be disposed on the top of the battery top cover 12, so as to prevent the wire harness 4 from being suspended and thus breaking due to vibrations during the use of the battery module.

In some preferred embodiments, the first clamping part 31 and the second clamping part are independently formed. The first clamping part 31 is provided with a holding part 34 for holding the second clamping part 32, or, the second clamping part 32 is provided with a holding part 34 for holding the first clamping part 31, wherein the holding part 34 is located at the one ends of the first clamping part 31 and the second clamping part 32 fixedly connected to each other. That is, the other end of the first clamping part 31 and the other end of the second clamping part 32 are connected to each other by the holding part 34.

The holding part 34 provided on the first clamping part 31 extends outwards respectively from two sides of the first clamping part 31 and thus forms two side wings. That is, the holding part 34 provided on the first clamping part 31 includes two side wings respectively connected to the two sides of the first clamping part 31. The side wing is formed in a shape of "L" and includes a first arm and a second arm. The second arm is connected to the first clamping part 31 via the first arm, and the second arms of the two side wings are formed to extend towards each other. After attaching the second clamping part 32 to the first clamping part 31, the two side wings of the first clamping part 31 holds the second clamping part 32 (that is, the second clamping part 32 is located between the two second arms and the first clamping part 31), so as to fix the first clamping part 31 with the second clamping part 32.

The holding part 34 provided on the second clamping part 32 extends outwards respectively from two sides of the second clamping part 32 and thus forms two side wings. That is, the holding part 34 provided on the second clamping part 32 includes two side wings respectively connected to the two sides of the second clamping part 32. The side wing is formed in a shape of "L" and includes a first arm and a second arm. The second arm is connected to the second clamping part 32 via the first arm, and the second arms of the two side wings are formed to extend towards each other. After attaching the first clamping part 31 to the second clamping part 32, the two side wings of the second clamping part 32 holds the first clamping part 31 (that is, the first clamping part 31 is located between the two second arms and the second clamping part 32), so as to fix the second clamping part 32 with the first clamping part 31.

In some preferred embodiments, the first clamping part 31 and the second clamping part 32 forms a guide opening 35, which flares outwards, at the end of the opening 33. That is, the ends of the first clamping part 31 and the second clamping part 32 separated from each other, extend away from each other and thus form a guide opening 35. The guide opening 35 functions to facilitate positioning of the clamping-sampling member 3 relative to the connecting member 2. After aligning the guide opening 35 of the clamping-sampling member 3 with the connecting member 2, the clamping-sampling member 3 may be pushed towards the connecting member 2 so that the clamping-sampling member 3 clamps the connecting member 2.

In some preferred embodiments, the first clamping part 31 is provided with a protrusion 36 on a side surface of the opening 33 facing the second clamping part 32, that is, the first clamping part 31 is provided with a protrusion 36 on a surface facing the second clamping part 32. Or, a second clamping part 32 is provided with a protrusion 36 on a side surface of the opening 33 facing the first clamping part 31, that is, the second clamping part 32 is provided with a protrusion 36 on a surface facing the first clamping part 31. The sampling installation portion 21 is provided with a connection hole 23, and the protrusion 36 is matched with the connection hole 23. When the clamping-sampling member 3 clamps the connecting member 2, the protrusion 36 provided on the first clamping part 31 or the second clamping part 32 is engaged with the connection hole 23, which can effectively prevent the clamping-sampling member 3 from detaching from the connecting member 2.

In some alternative embodiments, there are two or more connection holes 23, and there are two or more protrusions 36, which is beneficial for fixing the clamping-sampling member 3 in a direction parallel to the connecting member 2, so as to prevent the clamping-sampling member 3 from rotating in the connection hole 23 of the connecting member 2 and thus affecting the connection strength of the wire harness 4 with the wire connection portion 37.

As shown in FIG. 3 and FIG. 4, in some alternative embodiments, the sampling installation portion 21 is further provided with a guide slot 22 extending from an end of the sampling installation portion 21 towards an inside of the connecting member 2, and the protrusion 36 on the first clamping part 31 or the second clamping part 32 may slide along the guide slot 22. The guide slot 22 is used to facilitate positioning of the protrusion 36 on the first clamping part 31 or the second clamping part 32, so that the protrusion 36 on the first clamping part 31 or the second clamping part 32 can slide along the guide slot 22 and engage into the connection hole 23.

In some alternative embodiments, there are three connection holes 23 provided on the sampling installation portion 21, and the three connection holes 23 are distributed in a triangular arrangement, that is, the three connection holes 23 are not in the same straight line. Correspondingly, there are also three protrusions 36 provided on the first clamping part 31 or the second clamping part 32, wherein one of the connection holes 23 corresponds to an end position of the guide slot 22 and may communicate with the guide slot 22, or in other embodiments, may not communicate with the guide slot 22. In the present embodiment, one of the protrusions 36 on the clamping-sampling member 3 slides along the guide slot 22 until all the three protrusions 36 are engaged with the corresponding connection holes 23, so as to complete the installation of the clamping-sampling member 3.

In some preferred embodiments, the wire connection portion 37 has a U-shaped cross section, and the information collection wire harness 4 is mounted in a U-shaped groove of the wire connection portion 37, and then may be fixed by pressing two side walls of the U-shaped groove towards each other. The two side walls of the U-shaped wire connection portion 37 may protect the wire harness 4, provide a relatively large contact surface for the wire harness 4 and the clamping-sampling member 3, and enhance the connection strength of the wire harness 4. In other embodiments, the wire connection portion 37 may be formed as a tubular member. The information collection wire harness 4 is inserted into the tubular member and is fixed by extruding and deforming the wire harness 4.

It shall be understood by the person skilled in the art that the above embodiments are exemplary and not limiting. Different technical features appearing in different embodiments may be combined to achieve beneficial effects. On the basis of studying the accompanying drawings, descriptions and claims, the person skilled in the art are able to understand and realize the disclosed embodiments and other changes thereof. In the claims, the term "comprise" does not exclude other devices or steps; when an article is not modified with a quantifier, it is intended to include one or more articles, and can be used interchangeably with the term "one or more articles". Any reference numbers in the claims shall not be construed as limiting the scope of protection. The functions of the plurality of parts appearing in the claims can be realized by a single hardware or software module. The presence of certain technical features in different dependent claims does not mean that these technical features cannot be combined to achieve beneficial effects.

What is claimed is:

1. A battery module, comprising:
   two or more battery cells, each comprising an electrode terminal;
   a connecting member, wherein the electrode terminals of adjacent battery cells are connected by the connecting member; and
   a clamping-sampling member, comprising a wire connection portion for fixing a wire harness and a clamping portion, wherein one end of the clamping portion is connected with the wire connection portion and another end of the clamping portion clamps the connecting member,
   wherein a sampling installation portion is provided on a side of the connecting member facing the wire harness, and the clamping portion clamps the sampling installation portion,
   the sampling installation portion extends from the side of the connecting member facing the wire harness and is recessed towards a battery top cover, so that the clamping-sampling member is attached directly to the battery top cover when clamping the sampling installation portion.

2. The battery module according to claim 1, wherein the clamping portion comprises a first clamping part and a second clamping part, one end of the first clamping part is fixedly connected with one end of the second clamping part, while another end of the first clamping part and another end of the second clamping part form an opening of the clamping portion, and the one ends of the first clamping part and the second clamping part fixedly connected to each other are connected with the wire connection portion.

3. The battery module according to claim 2, wherein the first clamping part and the second clamping part are integrally formed.

4. The battery module according to claim 2, wherein the first clamping part and the second clamping part are independently formed;
   the first clamping part is provided with a holding part for holding the second clamping part, or the second clamping part is provided with a holding part for holding the first clamping part,
   wherein the holding part for holding the second clamping part or the holding part for holding the first clamping part is located at the one ends of the first clamping part and the second clamping part fixedly connected to each other.

5. The battery module according to claim 4, wherein the holding part for holding the second clamping part or the holding part for holding the first clamping part comprises two side wings respectively connected to two sides of the first clamping part or the second clamping part, each side wing is formed in a shape of "L" and comprises a first arm and a second arm, the second arm is connected to the first clamping part or the second clamping part via the first arm, and the second arms of the two side wings are formed to extend towards each other.

6. The battery module according to claim 2, wherein the first clamping part and the second clamping part form a guide opening which flares outwards at an end of the opening.

7. The battery module according to claim 2, wherein the first clamping part is provided with a protrusion on a side surface of the opening facing the second clamping part, or the second clamping part is provided with a protrusion on a side surface of the opening facing the first clamping part; and
   the sampling installation portion is provided with a connection hole, and the protrusion is matched with the connection hole.

8. The battery module according to claim 5, wherein there are two or more connection holes.

9. The battery module according to claim 5, wherein the sampling installation portion is further provided with a guide slot extending from an end of the sampling installation portion towards an inside of the connecting member, so that the protrusion on the first clamping part or the second clamping part can slide along the guide slot.

10. The battery module according to claim 1, wherein the wire connection portion has a U-shaped cross section, so that the wire harness is installed within the wire connection portion.

\* \* \* \* \*